United States Patent [19]

Okawa et al.

[11] Patent Number: 5,188,487
[45] Date of Patent: Feb. 23, 1993

[54] BALL END MILL

[75] Inventors: Masayuki Okawa, Ibaraki; Yasunori Murakami, Gifu, both of Japan

[73] Assignee: Mitsubishi Materials Corporation, Tokyo, Japan

[21] Appl. No.: 886,409

[22] Filed: May 21, 1992

[30] Foreign Application Priority Data

May 22, 1991 [JP] Japan ................. 3-36454[U]

[51] Int. Cl.⁵ .................. B23C 5/10; B23C 5/18; B23C 5/20
[52] U.S. Cl. ........................ 407/34; 407/54; 407/119
[58] Field of Search ............. 407/34, 42, 53, 54, 407/61, 118, 119

[56] References Cited

U.S. PATENT DOCUMENTS

| | | | |
|---|---|---|---|
| 4,222,690 | 9/1980 | Hosoi | 407/54 |
| 4,437,800 | 3/1984 | Araki et al. | 407/119 |
| 4,714,385 | 12/1987 | Komanduri | 407/119 |
| 4,898,499 | 2/1990 | Tsujimura et al. | 407/54 |
| 4,927,303 | 5/1990 | Tsujimura et al. | 407/54 |
| 4,934,881 | 6/1990 | Tsujimura et al. | 407/54 |
| 4,959,929 | 10/1990 | Burnand et al. | 407/119 |
| 5,011,515 | 4/1991 | Frushour | 407/119 |

FOREIGN PATENT DOCUMENTS 59-214510 12/1984 Japan .

*Primary Examiner*—William E. Terrell
*Attorney, Agent, or Firm*—Cushman, Darby & Cushman

[57] ABSTRACT

A ball end mill is disclosed which includes a tool body having an axis of rotation therethrough and having a forward end portion, and a cutting edge provided on the forward end portion of the tool body and having an arcuate shape as viewed in a direction opposite to the direction of rotation of the tool body. The cutting edge is comprised of a radially inner portion disposed adjacent to the axis of rotation of the tool body and extending radially inwardly of the tool body in a direction opposite to the direction of rotation of the tool body, and a radially outer portion extending from the inner portion radially outwardly and axially rearwardly of the tool body. Each of the inner and outer portions of the cutting edge is formed of a two-layered composite sintered complex having a base layer of cemented carbide and an upper layer of sintered super hardened compact disposed on the base layer and containing cubic boron nitride, diamond or the like. The composite sintered complex defining the outer portion of the cutting edge is arranged such that the upper layer is directed in the direction of rotation of the tool body while the composite sintered complex defining the inner portion of the cutting edge is arranged such that the upper layer is directed forwardly of the tool body.

4 Claims, 4 Drawing Sheets

BALL END MILL

BACKGROUND OF THE INVENTION

1. Field of the Invention

The present invention relates to a ball end mill having an arcuately shaped cutting edge at a forward end of a tool body, and in particular to an improvement of a ball end mill which has a cutting edge made of a composite sintered complex formed by integrally sintering cubic boron nitride (CBN), diamond or the like with cemented carbide.

2. Prior Art

FIGS. 5 and 6 depict a conventional ball end mill which comprises a generally cylindrical tool body 1 having an axis of rotation O therethrough and including a hemispherical forward end portion in which a pair of chip pockets 2 and 3 are formed in diagonally opposite relation to each other. Insert-receiving seats or recesses 4 and 5 are formed on those faces of the chip pockets which face in a direction of rotation of the tool body 1, and cutting inserts 6 and 7 are releasably attached to the insert-receiving seats 4 and 5, respectively.

Each of the inserts 6 and 7 is of a positive type, and comprises a plate-like insert body 8 defining a front face 9 and peripheral surfaces 10 extending from the front face 9. The intersection of one of the peripheral surfaces 10 with the front face 9 is of a quadrantal shape as viewed from the front face 9, and a composite sintered complex 11 is secured to this intersection to define a cutting edge 12. Each of the cutting inserts 6 and 7 is attached to the tool body 1 with the cutting edge 12 being protruded slightly radially outwardly from the hemispherical forward end portion of the tool body 1. Furthermore, the cutting edge 12 of the insert 6 is formed so as to be greater in length than the cutting edge 12 of the other insert 7, and is extended at its one end to a position adjacent to the axis O of rotation of the tool body 1.

The aforesaid composite sintered complex 11 is comprised of a two-layer construction having a base layer 14 of cemented carbide and an upper layer 13 of a sintered super hardened compact containing diamond, CBN or the like, and is secured by brazing or the like to the aforesaid intersection of the insert body 8 which is also formed of cemented carbide.

The ball end mill of the above construction has a high wear resistance due to the provision of the sintered super hardened compact layer, thereby exhibiting a relatively prolonged tool life.

In the cutting operation using a rotary cutter such as the above ball end mill, it is well known that the peripheral speed of the tool decreases radially inwardly of the tool body from an outer peripheral side, and hence the cutting resistance increases radially inwardly of the tool body. Accordingly, the cutting load exerted on the cutting edge during the cutting operation becomes the highest at a portion adjacent to the axis of the tool body, and hence the cutting edge 12, which is extended to the portion adjacent to the axis O of rotation of the tool body 1, is susceptible to chipping during the cutting operation.

For this reason, in the aforesaid ball end mill, that corner portion of the front face 9 of the cutting insert 6 which is to be disposed near the axis O of rotation of the tool body 1 is formed so as to be inclined or curved in such a manner that the radially inner portion of the cutting edge 12 extends radially inwardly of the tool body 1 in a direction opposite to the direction of rotation of the tool body 1, whereby the strength of the cutting edge 12 at the radially inner portion is enhanced to prevent the occurrence of chipping.

In order to define the inclined or curved surface at the corner portion of the front face 9 of the cutting insert 6, the corner portion will be simply removed. However, as will be seen from FIG. 6, when the corner portion is removed in the case of the cutting insert 6 which has the cutting edge 12 of composite sintered complex, not the sintered super hardened compact but the base layer 14 and the insert body 8 will be exposed. In order to prevent the exposure of these portions, the thickness of the upper layer of sintered super hardened compact of the composite sintered complex may be increased. However, this immediately leads to an increase of the manufacturing cost of the insert since the upper layer contains diamond or CBN. More specifically, when the distance between the axis O of the tool body 1 and the radially outer portion of the cutting edge 12 measured in the direction of thickness of the insert, i.e., the shifting distance h of the radially inner portion of the cutting edge 12 as indicated in FIG. 6, is set large, the radially inner portion of the cutting edge 12 is more reliably prevented from being chipped, However, since the thickness of the upper cutting edge layer 13 must be made large, a significant increase of the manufacturing cost is inevitable.

Furthermore, the base layer 14 and the insert body 8, which are both made of cemented carbide, have a lower wear resistance than the upper cutting edge layer 13 of sintered super hardened compact, and hence these base layer and insert body will be subjected to wear earlier than the upper cutting edge portion 13 of the cutting edge 12 after a prolonged period of use. As a result, the service life of the cutting insert may be shortened or may fluctuate.

SUMMARY OF THE INVENTION

It is therefore an object and feature of the present invention to provide a ball end mill which can be manufactured at a reduced cost, and has a prolonged tool life.

According to the present invention, there is provided a ball end mill comprising:

a tool body having an axis of rotation therethrough and having a forward end portion; and a cutting edge provided on the forward end portion of the tool body and having an arcuate shape as viewed in a direction opposite to the direction of rotation of the tool body, the cutting edge being comprised of a radially inner portion disposed adjacent to the axis of rotation of the tool body and extending radially inwardly of the tool body in a direction opposite to the direction of rotation of the tool body, and a radially outer portion extending from the inner portion radially outwardly and axially rearwardly of the tool body;

each of the inner and outer portions of the cutting edge being formed of a two-layered composite sintered complex having a base layer of cemented carbide and an upper layer of sintered super hardened compact disposed on the base layer and containing at least one constituent selected from the group consisting of cubic boron nitride and diamond, the composite sintered complex defining the outer portion of the cutting edge being arranged such that the upper layer is directed in the direction of rotation of the tool body while the composite sintered complex defining the inner portion of the cutting edge is arranged such that the upper layer is directed forwardly of the tool body.

In the above ball end mill, the inner and outer portions of the cutting edge are independently provided with the composite sintered complexes which are layered in a different arrangement such that the composite sintered complex defining the inner portion of the cutting edge is directed axially forwardly of the tool body. Therefore, the base layer or the insert body are prevented from being exposed, and the wearing of the inner portion of the cutting edge can be prevented from occurring without increasing the thickness of the upper cutting edge layer of the composite sintered complex.

DESCRIPTION OF THE PREFERRED EMBODIMENTS OF THE INVENTION

Figure 1A:
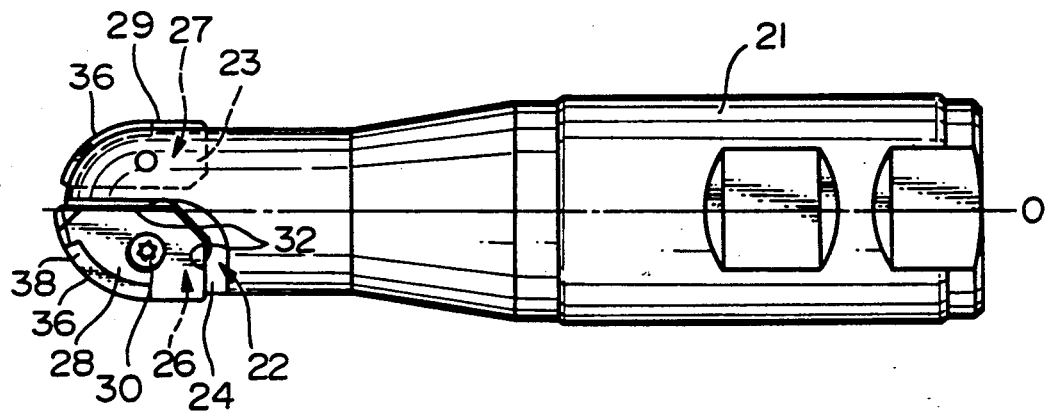
FIG. 1(a) is a side elevational view of a ball end mill in accordance with an embodiment of the present invention.
Figure 1B:
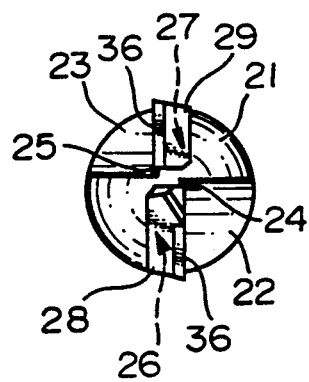
FIG. 1(b) is an end view of the ball end mill of FIG. 1(a)
Figure 2:
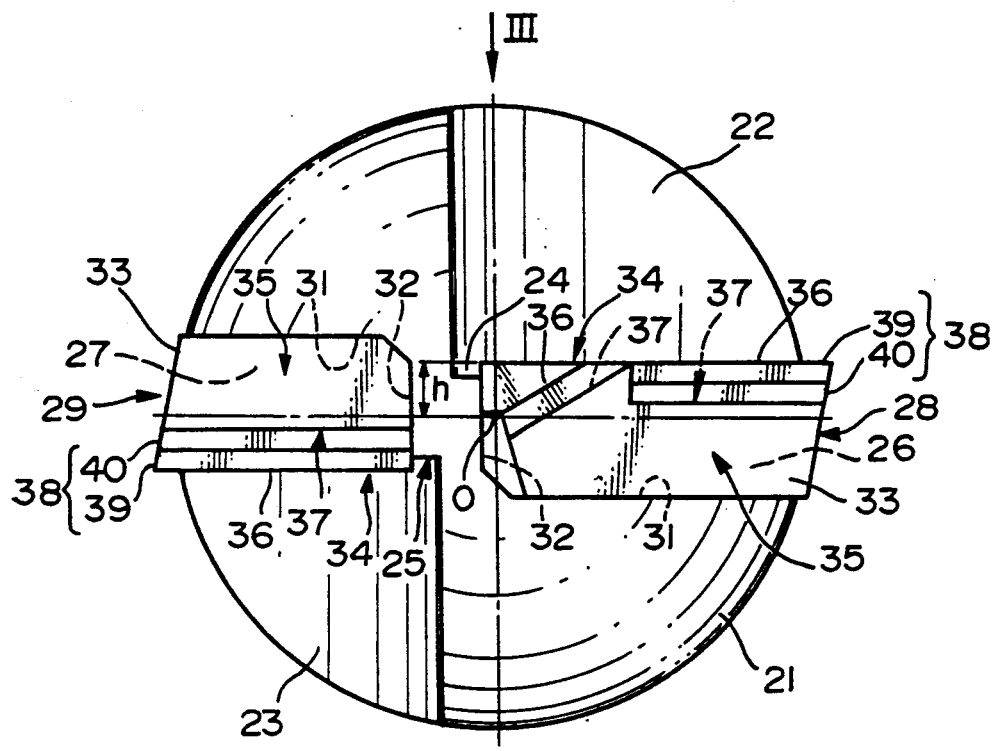
FIG. 2 is an enlarged view of FIG. 1(b)
Figure 3:
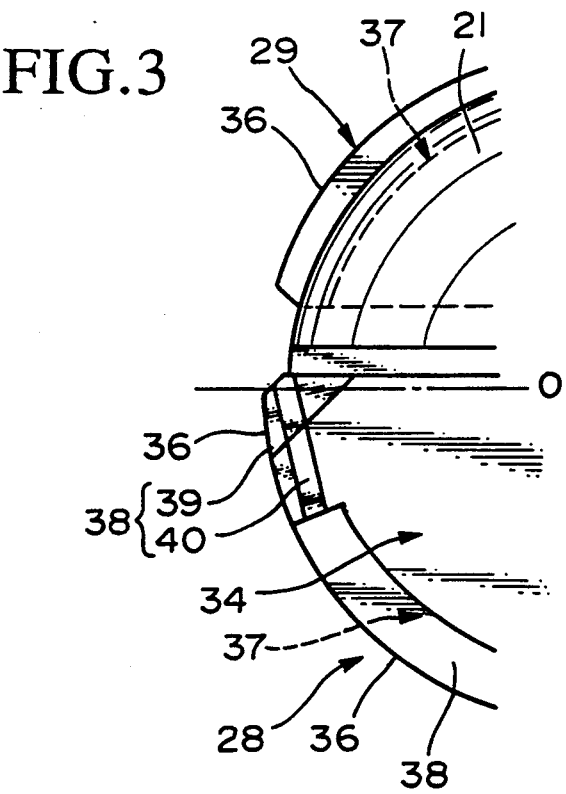
FIG. 3 is a view of the ball end mill of FIG. 2 as seen in the direction indicated by the arrow III in FIG. 2.

FIGS. 1 to 3 depict a ball end mill in accordance with a preferred embodiment of the present invention, which comprises a generally cylindrical tool body 21 having an axis O of rotation therethrough and having a hemispherical forward end portion of a reduced diameter. A pair of chip pockets 22 and 23 are formed in the forward end portion of the tool body 21 in diagonally opposite relation to each other so as to open to a forward end face and an outer peripheral surface thereof. The chip pockets 22 and 23 are formed by removing from the forward end portion of the tool body 21 portions of a quadrantal sector shape as viewed from the forward end portion, such that the bottom faces, which face in a direction of rotation of the tool body 21, are parallel to each other. Of the two chip pockets 22 and 23, the chip pocket 22 is formed such that the width of the bottom face 24 is greater than that of the bottom face 25 of the chip pocket 23 and slightly greater than the radius of the forward end portion of the tool body 21. Furthermore, insert receiving seats or recesses 26 and 27 are formed on the bottom faces 24 and 25 of the chip pockets 22 and 23 which face in a direction of rotation of the tool body 21, and cutting inserts 28 and 29 are releasably attached to the insert receiving seats 26 and 27, respectively, by means of mounting screws 30.

Each of the insert-receiving seats 26 and 27 is defined by a bottom face 31 and walls 32 extending therefrom so as to be generally vertical to the bottom face 31 and reaching the bottom face 24, 25 of a respective chip pocket. Each of the cutting inserts 28 and 29 attached to a respective insert receiving seat 26, 27 is of a positive type, and comprises a plate-like insert body 33 of a cemented carbide which defines a front face 34 and peripheral surfaces 10 extending from the front face 34. The intersection of the front face 34 with one of the peripheral surfaces 10 defines a cutting edge 36, and hence the front face 34 serves as a rake surface while the peripheral surface extending from the cutting edge serves as a relief surface.

Among the two cutting inserts 28 and 29, the insert 28, which is received on the insert-receiving seat 26 of the bottom face 24 of a larger width, is formed such that the cutting edge 36 has a generally quadrantal shape as viewed from the front face 34, whereas the other cutting insert 29 is formed such that the cutting edge 36 is slightly shorter than a quadrant as viewed from the front face 34.

Thus, in the indexed positions, the cutting edge 36 of the cutting insert 28 is disposed so as to extend radially outwardly of the tool body 21 from the axis O of rotation of the tool body 21, whereas the cutting edge 36 of the other cutting insert 29 is arranged so as to extend radially outwardly of the tool body from a position slightly spaced from the axis O of rotation of the tool body 21. Furthermore, the cutting edges 36 of the cutting inserts 28 and 29 are indexed so as to protrude slightly radially outwardly from the outer peripheral surface of the hemispherical forward end portion of the tool body 21.

Moreover, the corner portion of the front face 34 of the cutting insert 28 disposed adjacent to the axis O of rotation of the tool body 21 is formed so as to be inclined in a direction opposite to the direction of rotation of the tool body 21 as it approaches the axis O of rotation of the tool body 21 as well as the axially forward side of the axis O of rotation. With this construction, the inner portion of the cutting edge 36 of the insert 28 disposed adjacent to the axis O of rotation of the tool body 21 extends radially inwardly of the tool body 21 in the direction opposite to the direction of rotation of the tool body 21.

Furthermore, in each of the inserts 28 and 29, a recess or groove 37 is formed at an intersecting portion of the front face 34 with the peripheral surface 35 of the insert body 33, so as to open to a peripheral portion of the front face 34 and a marginal portion of the peripheral surface 35 adjacent to the front face 34, and a two-layered composite sintered complex 38, of a sintered super hardened compact and a cemented carbide formed by integral sintering, is received in and secured by brazing or the like to the aforesaid recess 37, the sintered super hardened compact containing diamond, CBN or a mixture of diamond and CBN.

In the cutting insert 28, the cutting edge 36 is divided into a radially inner portion which is disposed adjacent to the axis O of rotation of the tool body 21 and is inclined in a manner as described above, and a radially outer portion extending from the inner portion radially outwardly and axially rearwardly of the tool body 21. The composite sintered complexes 38 are separately provided on the intersecting portions or recesses corresponding to these portions, i.e., one composite sintered complex 38 is provided on the inner portion so as to define an inner portion of the cutting edge while another composite sintered complex 38 is provided on the outer portion to define an outer portion of the cutting edge. Furthermore, the composite sintered complex defining the outer portion of the cutting edge is arranged such that the upper cutting edge portion 39 of sintered super hardened compact is directed in the direction of rotation of the tool body 21, whereas the composite sintered complex defining the inner portion of the cutting edge is arranged such that the upper cutting edge portion 39 of sintered super hardened compact is directed forwardly of the tool body 21. Furthermore, in the other cutting insert 29, the composite sintered complex 38 of the cutting edge is arranged such that the upper cutting edge portion 39 of sintered super hardened compact is directed in the direction of rotation of the tool body 21.

In the foregoing, the composite sintered complexes 38 are shaped so as to be smoothly continuous with the outer shape of the insert body 33 of the inserts 28 and 29 before forming the recesses 37, and hence the composite sintered complexes come to have the elongated cutting edge portions 39 extending along and disposed in conformity with the intersection of the front face 34 with the peripheral surface 35. Thus, the marginal ridges of the composite sintered complexes serve as the aforesaid cutting edge portions 39, which define the cutting edge 36.

As described above, in the ball end mill in accordance with the present invention, inasmuch as the cutting edge 36 is defined by the cutting edge portions 39 of the composite sintered complexes 38, an excellent wear resistance can be ensured. In addition, since the inner portion of the cutting edge 36 disposed adjacent to the axis O of rotation of the tool body 21 is inclined in a specific manner as mentioned above, the strength at the cutting edge 36 is enhanced at its inner portion so that the chipping of the cutting edge 36 can be prevented.

Furthermore, in the ball end mill of the present invention, the composite sintered complex 38 defining the inner portion of the cutting edge 36 is separated from the composite sintered complex 38 defining the outer portion of the cutting edge 6, and is arranged such that its upper cutting edge portion 39 composed of sintered super hardened compact is directed forwardly of the tool body 21.

For this reason, even if the inner portion of the cutting edge 36 is formed so as to be inclined as specified above in order to enhance its strength, the cemented carbide base layer 40 as well as the cemented carbide insert body 33 are prevented from being exposed. Accordingly, the radially inner portion of the cutting edge 36 can be prevented from being worn off without increasing the thickness of the composite sintered complex 38 unduly. Therefore, the tool life of the ball end mill can be substantially prolonged while preventing the increase in the manufacturing cost.

The present invention is very effective especially in the case where the distance between the axis O of rotation of the end mill body and the radially outer portion of the cutting edge 36, as measured in a direction of the thickness of the insert, i.e., the shifting distance of the inner portion of the cutting edge 36 as indicated by h in FIG. 2, is set so as to be large in order to obtain a substantially increased strength.

Figure 4:
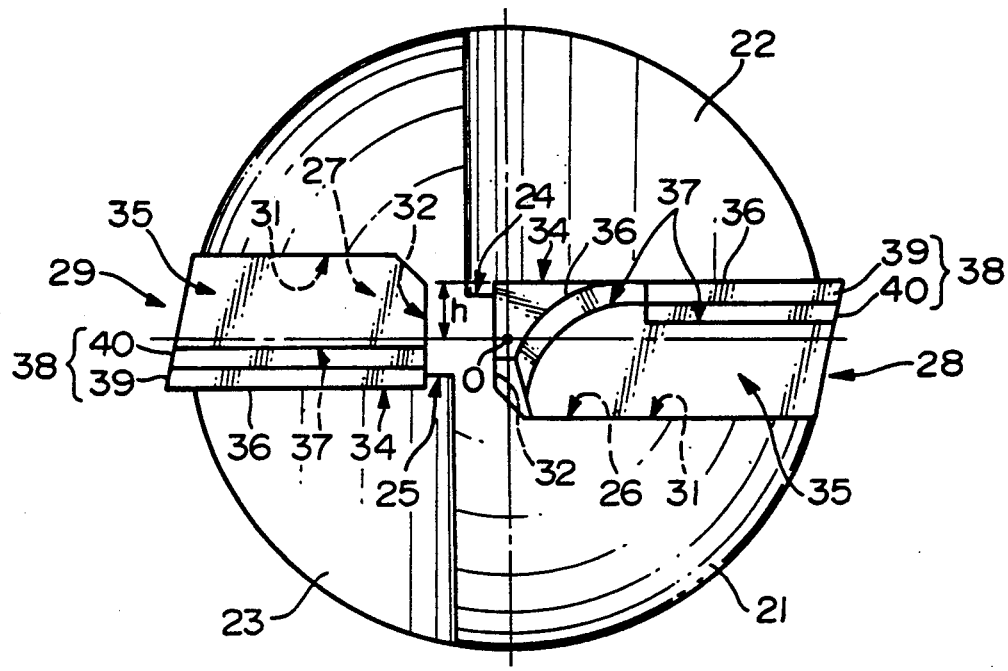
FIG. 4 is an enlarged front elevational view of a ball end mill in accordance with another embodiment of the invention.
Figure 6:
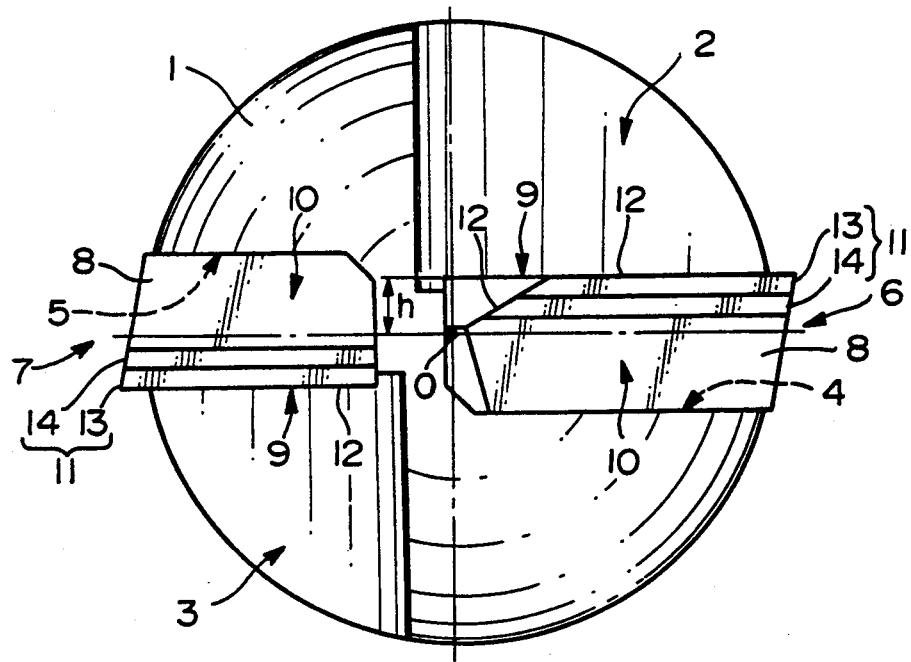
FIG. 6 is an enlarged view of FIG. 5(b).
Figure 5A:
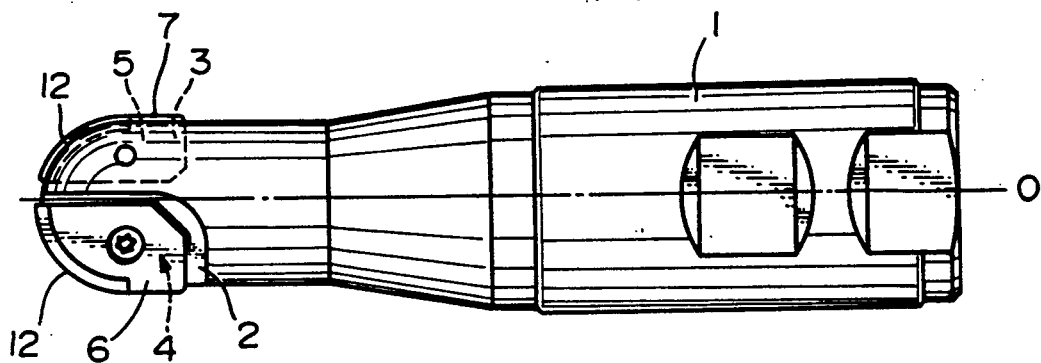
FIG. 5(a) is a side elevational view of a conventional ball end mill.
Figure 5B:
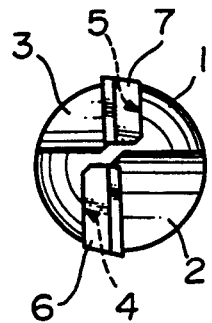
FIG. 5(b) is an end view of the ball end mill of FIG. 5(a)

FIG. 4 depicts a second embodiment in accordance with the present invention, in which the same numerals are used to designate parts similar to those in the previous embodiment in order to simplify explanation. In this embodiment, the composite sintered complex cutting edge 36 of the cutting insert 28 is provided with an inner portion of a quadrantal shape as viewed from the forward end side of the tool body 21, whereby the cutting edge 36 defined by the sintered super hardened compact of the composite sintered complex 38 is arcuately curved so as to extend radially inwardly of the tool body 21 in the direction opposite to the direction of rotaion of the tool body 21 as viewed axially of the tool body 21, i.e., the inner portion of the cutting edge is curved arcuately convexly in a direction of rotation of the tool body 21 as viewed axially of the tool body 21.

In this embodiment, too, the composite sintered complex 38 defining the inner portion of the cutting edge 36 is formed separately from the composite sintered complex 38 defining the outer portion of the cutting edge, such that the upper cutting edge portion of sintered super hardened compact is directed forwardly of the tool body 21. Therefore, the same advantageous effects as in the previous embodiment shown in FIGS. 1 to 3 can be attained.

Obviously, many modifications and variations of the present invention are possible in the light of the above teachings. For example, in the above embodiments, the composite sintered complex is formed by integral sintering so as to have the cutting edge portion of sintered super hardened compact and the base layer of cemented carbide disposed underneath the cutting edge portion. However, a super hardened compact defining a cutting edge portion may be directly secured to an insert body of cemented carbide, and in this case, the cemented carbide of the insert body serves as a base layer. Furthermore, the present invention may not be limited to a ball end mill of an insert type, but may be applied to a ball end mill of a solid type in which a composite sintered complex is directly secured to the tool body. Anyhow, it is to be understood that within the scope of the appended claims, the invention may be practiced otherwise than as specifically described.

What is claimed is:

1. A ball end mill comprising:
    a tool body having an axis of rotation therethrough and having a forward end portion; and
    a cutting edge provided on said forward end portion of said tool body and having an arcuate shape as viewed in a direction opposite to the direction of rotation of said tool body, said cutting edge being comprised of a radially inner portion disposed adjacent to said axis of rotation of said tool body and extending radially inwardly of said tool body in a direction opposite to the direction of rotation of said tool body, and a radially outer portion extending from said inner portion radially outwardly and axially rearwardly of said tool body;
    each of said inner and outer portions of said cutting edge being formed of a two-layered composite sintered complex having a base layer of cemented carbide and an upper layer of sintered super hardened compact disposed on said base layer and containing at least one constituent selected from the group consisting of cubic boron nitride and diamond, said composite sintered complex defining said outer portion of said cutting edge being arranged such that said upper layer is directed in the direction of rotation of said tool body while said composite sintered complex defining said inner portion of said cutting edge is arranged such that said upper layer is directed forwardly of said tool body.

2. A ball end mill as recited in claim 1, further comprising a cutting insert releasably attached to said tool body, said cutting insert including an insert body and said composite sintered complex secured to said insert body so as to define said cutting edge.

3. A ball end mill as recited in claim 2, wherein said inner portion of said cutting edge is straight as viewed axially of said tool body.

4. A ball end mill as recited in claim 2, wherein said inner portion of said cutting edge is curved convexly in a direction of rotation of said tool body as viewed axially of said tool body.

* * * * *